US011385334B2

(12) United States Patent
Kondo et al.

(10) Patent No.: US 11,385,334 B2
(45) Date of Patent: Jul. 12, 2022

(54) OPTICAL SCANNING ELEMENT

(71) Applicant: NGK INSULATORS, LTD., Nagoya (JP)

(72) Inventors: Jungo Kondo, Miyoshi (JP); Naotake Okada, Anjo (JP); Tetsuya Ejiri, Kasugai (JP); Keiichiro Asai, Nagoya (JP); Shoichiro Yamaguchi, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 806 days.

(21) Appl. No.: 16/237,860

(22) Filed: Jan. 2, 2019

(65) Prior Publication Data
US 2019/0154811 A1 May 23, 2019

Related U.S. Application Data

(63) Continuation of application No. PCT/JP2017/006761, filed on Feb. 23, 2017.

(30) Foreign Application Priority Data

Jul. 7, 2016 (JP) .............................. JP2016-134820
Aug. 22, 2016 (JP) .............................. JP2016-161991

(51) Int. Cl.
*G01S 7/481* (2006.01)
*G02F 1/295* (2006.01)
(Continued)

(52) U.S. Cl.
CPC ............ *G01S 7/4818* (2013.01); *G01S 7/481* (2013.01); *G01S 7/499* (2013.01); *G01S 17/08* (2013.01); *G02F 1/295* (2013.01); *G02F 1/2955* (2013.01)

(58) Field of Classification Search
CPC ........ G01S 7/4818; G01S 7/481; G01S 7/499; G01S 7/08; G01S 17/08; G02F 1/295;
(Continued)

(56) References Cited

U.S. PATENT DOCUMENTS 5,703,710 A 12/1997 Brinkman et al.
5,706,370 A 1/1998 Yuki
(Continued)

FOREIGN PATENT DOCUMENTS

EP  0 431 974 A2  6/1991
EP  2 846 186 A1  3/2015
(Continued)

OTHER PUBLICATIONS

Extended European Search Report, European Application No. 17823792.1, dated May 29, 2019 (9 pages).
(Continued)

Primary Examiner — Yuqing Xiao
Assistant Examiner — Amir J Askarian
(74) Attorney, Agent, or Firm — Burr & Brown, PLLC

(57) ABSTRACT

An optical scanning device includes a supporting body 2; an optical waveguide composed of a single crystal having electro-optic effect and integrated with the supporting body directly or through a clad layer; a plurality of periodic domain inversion parts formed in the optical waveguide, the periodic domain inversion parts having periods different from each other; and a plurality of electrodes capable of applying voltages on the periodic domain inversion parts, respectively, to generate diffraction gratings in the periodic domain inversion parts, respectively. The clad layer is composed of a material having a refractive index lower than a refractive index of the single crystal forming the optical waveguide. Each of the periodic domain inversion parts on which the voltage is applied is selected to generate the (Continued)

diffraction grating in the selected periodic domain inversion part so that a propagation light propagated in the optical waveguide is emitted to the outside of the optical scanning device as a diffracted light.

11 Claims, 15 Drawing Sheets

(51) Int. Cl.
  *G01S 7/499* (2006.01)
  *G01S 17/08* (2006.01)
(58) Field of Classification Search
  CPC ........ G02F 1/2955; G02F 1/3775; G02F 1/05;
  G02F 1/292; G02F 1/3503; G02F 1/3505;
  G02F 1/3507; G02F 1/3534; G02F
  1/3558; G02F 2201/30; G02F 2202/07;
  G02F 2202/20; G02F 2203/05; G02F
  2203/07; G03F 7/70383; G03F 7/70575;
  G03H 1/0011; G03H 1/0244; G03H
  1/2249; G03H 1/30; G03H 2001/0497;
  G03H 2210/30; G03H 2240/21; G03H
  2240/24
  See application file for complete search history.

(56) References Cited

U.S. PATENT DOCUMENTS

| | | | |
|---|---|---|---|
| 5,887,089 | A | 3/1999 | Deacon et al. |
| 6,025,864 | A * | 2/2000 | Nashimoto ............. G02B 6/10 347/243 |
| 6,084,626 | A | 7/2000 | Ramanujan et al. |
| 7,236,674 | B2 * | 1/2007 | Mizuuchi ................ G02B 6/10 |
| 2002/0101648 | A1 * | 8/2002 | Arie ................ G01N 35/00069 385/16 |
| 2009/0091834 | A1 * | 4/2009 | Ryzi ..................... G02B 5/1842 359/569 |
| 2012/0155824 | A1 | 6/2012 | Suzuki et al. |
| 2012/0182535 | A1 * | 7/2012 | Okazaki ............. G03F 7/70575 359/329 |
| 2012/0226411 | A1 | 9/2012 | Kuoch et al. |
| 2014/0293267 | A1 | 10/2014 | Itao et al. |
| 2015/0070676 | A1 | 3/2015 | Okazaki et al. |
| 2016/0012638 | A1 * | 1/2016 | Skrobanski ............. G06T 17/20 |

FOREIGN PATENT DOCUMENTS

| | | |
|---|---|---|
| JP | H06-289440 A | 10/1994 |
| JP | H10-507281 A1 | 7/1998 |
| JP | H11-337891 A1 | 12/1999 |
| JP | 2011-048067 A1 | 3/2011 |
| JP | 2013-003253 A1 | 1/2013 |
| JP | 2013-061488 A1 | 4/2013 |
| JP | 2013-148446 A1 | 8/2013 |
| JP | 2013-195687 A1 | 9/2013 |
| JP | 2015-052701 A1 | 3/2015 |
| JP | 5683629 B2 | 3/2015 |
| JP | 5793308 B2 | 10/2015 |
| JP | 5802659 B2 | 10/2015 |

OTHER PUBLICATIONS

Gu, Xiaodong, et al. "Electro-Thermal Beam Steering Using Bragg Reflector Waveguide Amplifier," *Japanese Journal of Applied Physics*, vol. 51, dated 2012 (4 pages).
English Translation of International Preliminary Report on Patentability, International Application No. PCT/JP2017/006761, dated Jan. 17, 2019 (7 pages).
David A. Scrymgeour, et al., "Large-Angle Electro-Optic Laser Scanner on LiTaO, Fabricated by in situ of Ferroelectric-Domain Micropatterning," *Applied Optics*, vol. 40, No. 34, Dec. 1, 2001, pp. 6236-6241.
Toshiyuki Inoue, et al., "Electrooptic Bragg Deflection Optical Modulator Using Periodically Poled MgO: $LiNbO_3$," *The Society of Applied Physics*, extended Abstracts of the 7th Meeting of 2010, Autumn, Sep. 2010, p. 5-084.
Akihiro Morimoto, et al., "Laser Beam Control by Electro-Optic Devices Using Polarization Reversal," *Laser Review*, Vo. 32, Issue 3, Mar. 2004, pp. 165-169.
Masahide Okazaki, et al., "Electrooptic Bragg Deflection Modulator for UV Laser Light Using Periodically Poled MgO:s-$LiTaO_3$," *IEEE Photonics Technology Letters*, Nov. 15, 2011, vol. 23, No. 22, pp. 1709-1711.
International Search Report and Written Opinion (Application No. PCT/JP2017/006761) dated May 23, 2017.

* cited by examiner

OPTICAL SCANNING ELEMENT

TECHNICAL FIELD

The present invention relates to an optical scanning device for emitting light to a plurality of directions different from each other to obtain information.

BACKGROUND ARTS

It has been demanded a display or a projector of a high precision, high image quality and large screen size, due to the development of multi-media and digital signage. It has been intensively developed an optical scanning device capable of wide-angle scanning of laser light. Recently, the optical scanning device can be used as a laser radar, laser scanner or LIDAR (Light Detection and Ranging) and it has been studied the application to control of auto driving of an automobile, a system for detecting obstacles for controlling the position of a robot or drone and a system for measuring a distance.

As a mechanism for the optical scanning, it has been the mainstream a mechanical system such as polygon mirror system or MEMS system.

Patent documents 1 and 2 discloses a mechanical system of scanning laser light onto a mirror driven and rotated by a motor to scan light. Light reflected by an object is detected by a receiving element to calculate a distance to an object or a position of the object based on time delay. As the mirror, it is used a planar mirror or polygon mirror having shape of polygon.

Patent document 3 discloses mechanical system of using an MEMS mirror. The MEMS has the structure that a movable part is formed by a beam having a two-degree of freedom through semiconductor process on silicon and that it is formed a metal reflection film having a high reflectivity on a surface of the movable part to provide a mirror. A permanent magnet is positioned around the movable part and a current is flown in a coil of the movable part to generate Lorentz force to control the direction of emission.

Patent documents 4 discloses the system of light-receiving element-division which does not require a movable part. According to this system, laser light is enlarged by a lens to the angle wider so that the reflected light is detected by divided receiving elements to realize the detection of a surface to be measured. However, as the number of the divided elements is made large, an amount of the reflected light incident into a single receiving element becomes low, so that a signal/noise ratio (S/N) is deteriorated. In this case, it may be considered that a power of a light source is made larger for increasing an amount of the received light. However, the cost of the light source is thereby increased due to the increase of the power of the light source and the problem of eye safe is further provided.

On the other hand, the inventors proposed an optical switching device by utilizing a substrate of lithium niobate or lithium tantalate, by forming a plurality of prism-shaped polarization inversion parts in the substrate, by thinning the substrate and by providing electrodes. However, this device provides a change of direction of the emitted light due to electro-optic effect of 10° or lower and is not an optical scanning device capable of scanning in a wide angle.

Further, in the case of a device utilizing electro-optic effect, it is well known the device having electrodes in a prism (non-paten document 1).

However, according to such prism-type polarization device utilizing an electro-optic crystal such as lithium niobate, the change of the refractive index due to the electro-optic effect is relatively small. For example, in the case of lithium niobate, it is necessary to apply a large electric field such as about 4.5 kV/mm on the crystal for obtaining the change Δn of the refractive index of 0.001.

Patent document 6 discloses the structure that the thickness of the substrate of lithium niobate is made smaller for reducing its driving voltage.

Patent document 7 describes an example of a switching device applying polarization inversion, having a slab-type optical waveguide, a polarization inversion part and an electrode formed on an upper part of the polarization inversion part. In this case, the single polarization inversion part is formed along the side of progression of the slab-type optical waveguide and periodically formed in the direction perpendicular to the propagating direction of the slab-type waveguide. As periodic refractive index structure is formed in the polarization inversion part upon applying a voltage in the slab-type optical waveguide, it can function as a diffraction grating. It is thus utilized the polarization of light due to the diffraction effect. In this case, the polarization angle is 2 to 3°.

RELATED DOCUMENTS

[Non-Patent Document 1] "Scrymgeour, D. A.," Large-angle electro-optic laser scanner on LiTaO3 fabricated by in situ monitoring of ferroelectric-domain micropatterning, Appl. Opt., 40-34, (2001)"
[Patent Document 1] Japanese Patent No. 5802659B
[Patent Document 2] Japanese Patent Publication No. 2013-148446A
[Patent Document 3] Japanese Patent Publication No. 2013-003253A
[Patent Document 4] Japanese Patent No. 5683629B
[Patent Document 5] Japanese Patent Publication No. 2013-195687A
[Patent Document 6] Japanese Patent Publication No. 2011-048067A
[Patent Document 7] Japanese Patent No. 5793308B

SUMMARY OF THE INVENTION

Object to be Solved by the Invention

According to prior optical scanning devices, the movable part is necessary or the signal/noise ratio in the optical receiving device is large, which is problematic. Further, although it is known the optical switching device utilizing the prism-shaped polarization inversion part, it is to polarize the direction of the propagating light in an angle of 10° or lower and is not suitable as a laser scanner.

An object of the present invention is to provide an optical scanning device alleviating the need of a movable part and capable of scanning in a wide angle.

Solution for the Object

The present invention provides an optical scanning device for selectively emitting emission lights to a plurality of directions different from each other. The device includes:
a supporting body;
an optical waveguide comprising a single crystal having electro-optic effect and integrated with the supporting body directly or through a clad layer;

a plurality of periodic domain inversion parts formed in the optical waveguide, the periodic domain inversion parts having periods different from each other;

a plurality of electrodes each capable of applying a voltage on each of the periodic domain inversion parts to generate a diffraction grating in each of the periodic domain inversion parts, respectively; and a side face clad provided between the optical waveguide and each of the electrodes. The clad layer and side face clad are composed of materials each having a refractive index lower than a refractive index of the single crystal forming the optical waveguide. Each of the periodic domain inversion parts on which the voltage is applied is selected to generate the diffraction grating in the selected periodic domain inversion part, a propagation light is propagated ion the optical waveguide, and the propagation light is emitted to the outside of the optical scanning device as a diffracted light.

The present invention further provides a method of scanning a surface to be measured using the optical scanning device. The emission light emitted from the optical scanning device is irradiated onto the surface to be measured, and reflection light reflected by the surface to be measured is used to obtain data relating to the surface to be measured.

Effects of the Invention

According to the present invention, it is provided a plurality of periodic domain inversion parts having periods different from each other in an optical waveguide, and it is selected the periodic domain inversion part for applying a voltage to generate a diffraction grating in the selected domain inversion part. Propagation light propagating in the optical waveguide is emitted to the outside of the optical scanning device by the diffraction grating. The emission light beams are emitted in directions different from each other from the diffraction gratings having the different period, respectively. It is thus possible to emit the emission light beams to the predetermined directions for scanning without a movable part.

For example, an object may be scanned by the light beams, so that it is possible to measure times for the incident light to be reflected by the object and the returned light beam to be received, respectively. Three-dimensional information can be thereby obtained to detect an obstacle.

MODES FOR CARRYING OUT THE INVENTION

Figure 1:
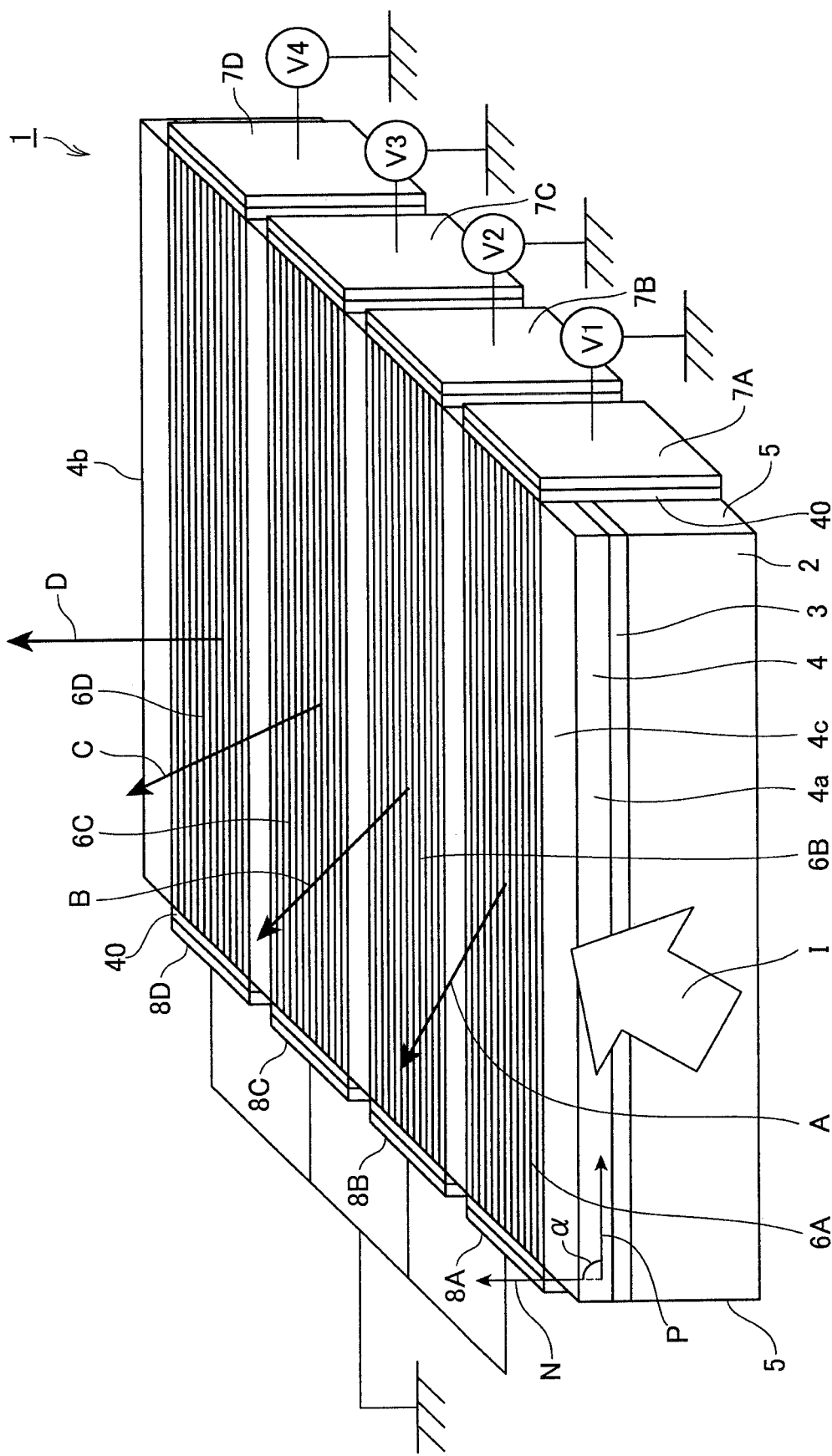
FIG. 1 is a view schematically showing an optical scanning device 1 according to an embodiment of the present invention.

FIG. 1 is a perspective view schematically showing an optical scanning device 1 according to an embodiment of the present invention.

According to the present example, a slab-type optical waveguide 4 made of a single crystal is provided through a clad layer 3 over a supporting body 2. An upper-side clad layer may be further provided on the optical waveguide 4. The optical waveguide 4 includes an incident face 4a of light beam and an opposing face 4b opposing the incident face 4a. Further, a predetermined number of periodic domain inversion parts 6A, 6B, 6c and 6D are provided in the optical waveguide 4, and domain inversion planes of each of the periodic domain inversion parts is elongated substantially parallel with the incident face 4a. The periods of the respective periodic domain inversion parts are made different from each other.

Further, electrodes are formed corresponding to the periodic domain inversion parts 6A to 6D, respectively, through a side clad layer 40 on a side face 5 of the device 1. That is, electrodes 7A and 8A are provided on both sides of the periodic domain inversion part 6A, respectively, electrodes 7B and 8B are provided on both sides of the periodic domain inversion part 6B, respectively, electrodes 7C and 8C are provided on both sides of the periodic domain inversion part 6C, respectively, and electrodes 7D and 8D are provided on both sides of the periodic domain inversion part 6D, respectively. Then, electric power sources V1, V2, V3 and V4 are connected to the electrodes 7A, 7B, 7C and 7D, respectively, and the electrodes 8A, 8B, 8C and 8D are earthed, respectively.

In operation, light is made incident into the incident face 4a of the optical waveguide. The light propagates in the optical waveguide 4 and then emitted from the opposing face 4b. That is, the optical waveguide functions as a slab-type optical waveguide. However, in the case that a voltage is applied onto one or plural periodic domain inversion part(s), electric fields of reverse polarity are alternately applied in the periodic domain inversion part(s) on which the voltage is applied, so that the refractive index is changed depending on the intensity of the electric field. In the case that regions having different refractive indices are alternately provided at a predetermined interval, the regions function as a diffractive grating. On the other hand, in the periodic domain inversion parts without the application of a voltage, the difference of the refractive indices is not provided, or only a small difference of the indices is provided, so that a diffractive grating is not generated.

As a result, the propagation light propagating in the optical waveguide propagates without modification in the periodic domain inversion part with the voltage not applied. When the propagation light passes through the periodic domain inversion part with the voltage applied thereon, the diffraction light is radiated to the outside of the device by the effect of the diffraction grating as described later.

For example, according to an example shown in FIG. 1, in the case that the voltage is applied on the periodic domain inversion part 6A, the diffracted light is radiated as an arrow A as an emitted light, in the case that the voltage is applied on the periodic domain inversion part 6B, the diffracted light is radiated as an arrow B as the emitted light, in the case that the voltage is applied on the periodic domain inversion part 6C, the diffracted light is radiated as an arrow C as the emitted light, and in the case that the voltage is applied on the periodic domain inversion part 6D, the diffracted light is radiated as an arrow D as the emitted light. Then, the angles of radiation of the respective radiated light beams A to D are determined upon the periods of the periodic domain inversion parts, respectively, and thus different from each other.

According to a preferred embodiment, it is provided a ridge-type optical waveguide for propagating light in the optical waveguide to propagate the incident light.

Figure 2:
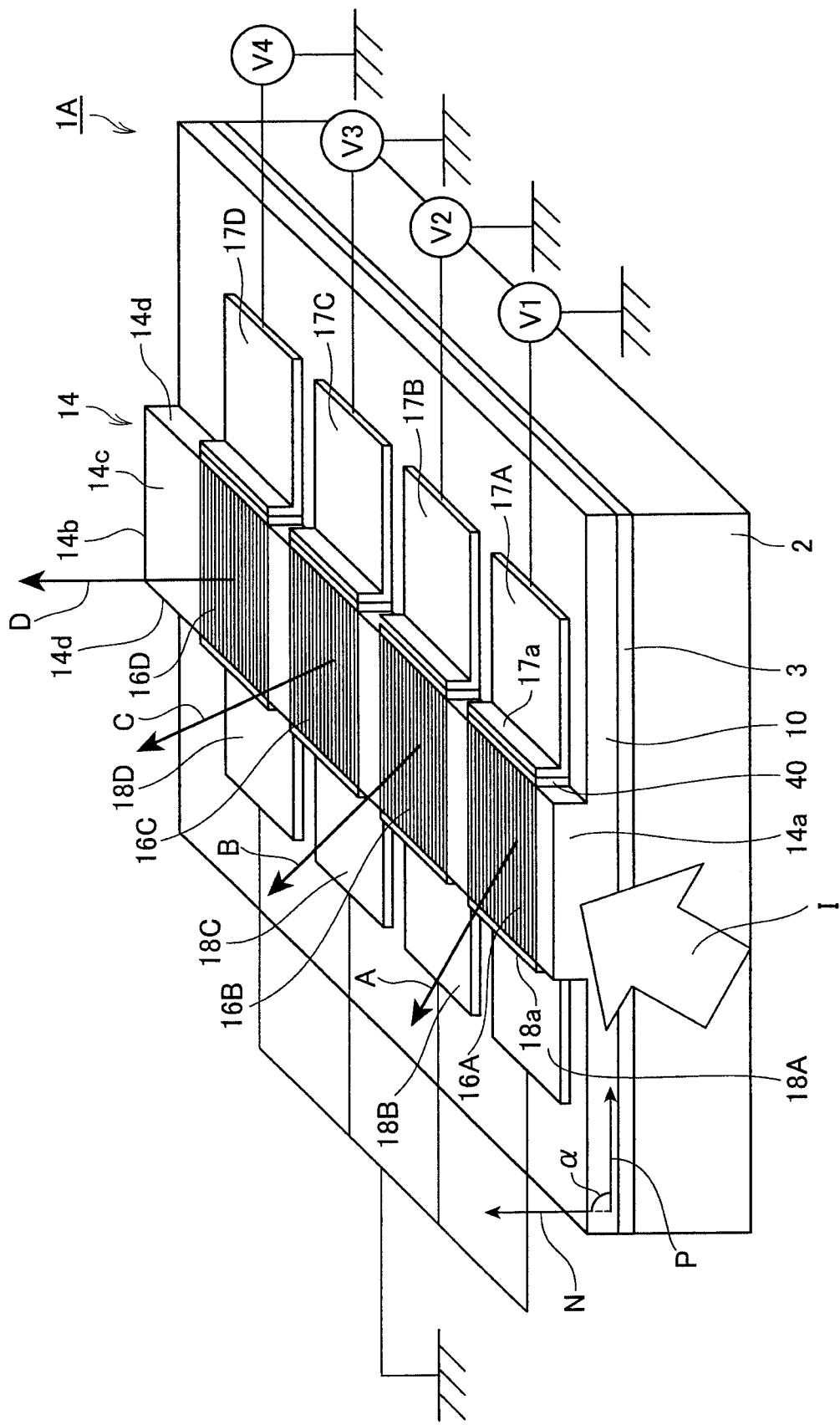
FIG. 2 is a schematic view showing an optical scanning device 1 A according to another embodiment of the present invention.

That is, according to an embodiment shown in FIG. 2, the single crystal layer 10 is provided over the supporting body 2 through the clad layer 3. The upper clad layer not shown may be provided on the single crystal layer 10. A ridge-type optical waveguide 14 is provided in the single crystal layer 10 and both sides of the optical waveguide 14 are made flat surfaces, respectively. An incident face 14a and opposing face 14b opposing the incident face 14a are provided in the optical waveguide 14.

Further, a predetermined number of periodic domain inversion parts 16A, 16B, 16C and 16D is provided in the optical waveguide 14, and domain inversion planes of each of the periodic domain inversion parts is elongated substantially parallel with the incident face 14a. The periods of the respective periodic domain inversion parts are made different from each other.

Further, electrodes are formed corresponding to the periodic domain inversion parts 16A to 16D, respectively, on a side face of the ridge-type optical waveguide 14. That is, electrodes 17A and 18A are provided on both sides of the periodic domain inversion part 16A, respectively, electrodes 17B and 18B are provided on both sides of the periodic domain inversion part 16B, respectively, electrodes 17C and 18C are provided on both sides of the periodic domain inversion part 16C, respectively, and electrodes 17D and 18D are provided on both sides of the periodic domain inversion part 16D, respectively. Then, electric power sources V1, V2, V3 and V4 are connected to the electrodes 17A, 17B, 17C and 17D, respectively, and the electrodes 18A, 18B, 18C and 18D are earthed, respectively. Preferably, the respective electrodes are elongated to the flat upper surface of the single crystal layer 10. Besides, 40 represents a side face clad layer.

In operation, light is made incident into the incident face 14a of the optical waveguide 14. The light propagates in the optical waveguide 14 and is then emitted from the opposing face 14b. Then, in the case that the voltage is applied onto one or plural periodic domain inversion part(s), the refractive index is alternately changed at a predetermined interval depending on the voltage as described above in the periodic domain inversion part, which functions as a diffractive grating. On the other hand, in the periodic domain inversion parts without the application of a voltage, the difference of the refractive indices is not provided or only a small difference of the refractive indices is provided, so that the diffraction grating is not provided.

Here, the voltage applied onto the periodic domain inversion part is preferably a direct current voltage.

As a result, the propagation light propagating in the optical waveguide 14 propagates as such in the periodic domain inversion part with the voltage not applied. When the propagation light passes through the periodic domain inversion part with the voltage applied thereon, the diffracted light is radiated to the outside of the device by the effect of the diffraction grating as described later.

For example, according to an example shown in FIG. 2, in the case that the voltages are applied on the periodic domain inversion parts 16A, 16B, 16C and 16D, respectively, the diffracted light is radiated as arrows A, B, C and D, respectively, as the radiated light. Then, the angles of radiation of the respective radiated light beams A to D are determined upon the periods of the periodic domain inversion parts, respectively, and thus different from each other.

Figure 3:
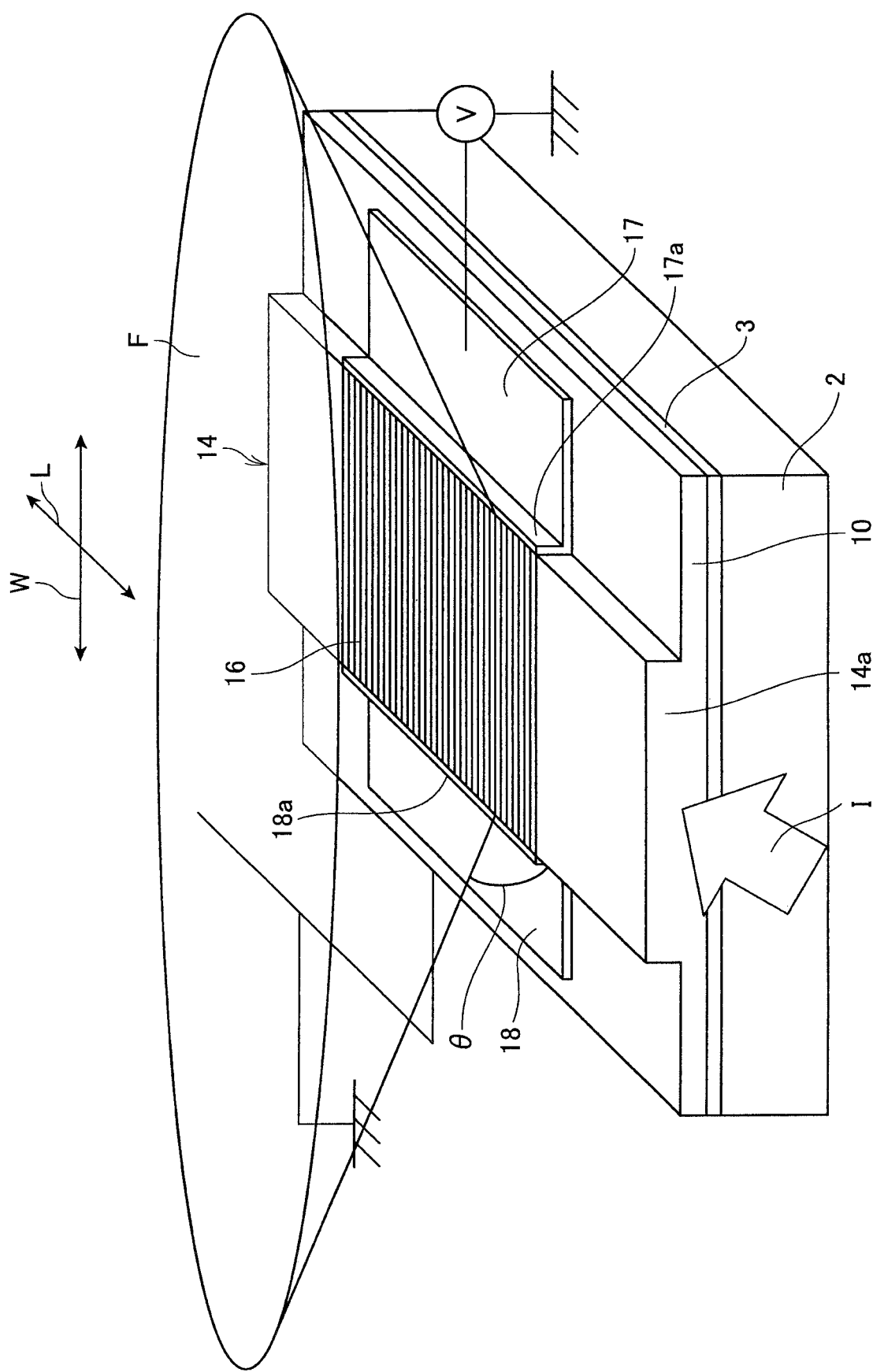
FIG. 3 is a view schematically showing emitted light beam emitted from a periodic domain inversion part.

FIG. 3 is a diagram schematically illustrating the mode of expansion of the radiated light beams radiated from the periodic domain inversion parts, respectively. When the voltage is applied from the power source V onto the periodic domain inversion part 16, the periodic domain inversion part forms a diffraction grating and the radiation light is emitted to a predetermined direction. Here, "L" is assigned to the lengthwise direction of the device and "W" is assigned to a direction parallel with the domain inversion plane and parallel with the width direction of the optical waveguide. As a result, the radiated light is radiated in a wide range from the periodic domain inversion part as shown by "F". On the other hand, the angles (radiation angles) θ of the radiation lights with respect to the upper surface of the optical waveguide are different from each other depending on the periodic domain inversion parts. By this, the voltages are applied in the order onto the periodic domain inversion parts, respectively, so that the radiation angles θ can be changed in the order. Besides, reference numerals 17 and 18 represent electrodes.

According to the present invention, the voltage is applied onto the periodic domain inversion part to generate the diffraction grating, and the direction of propagation of the light propagation in the optical waveguide is changed and the radiation light is radiated to the outside from the optical waveguide core by the diffraction grating. The principle of the grating coupler is described below.

Figure 4:
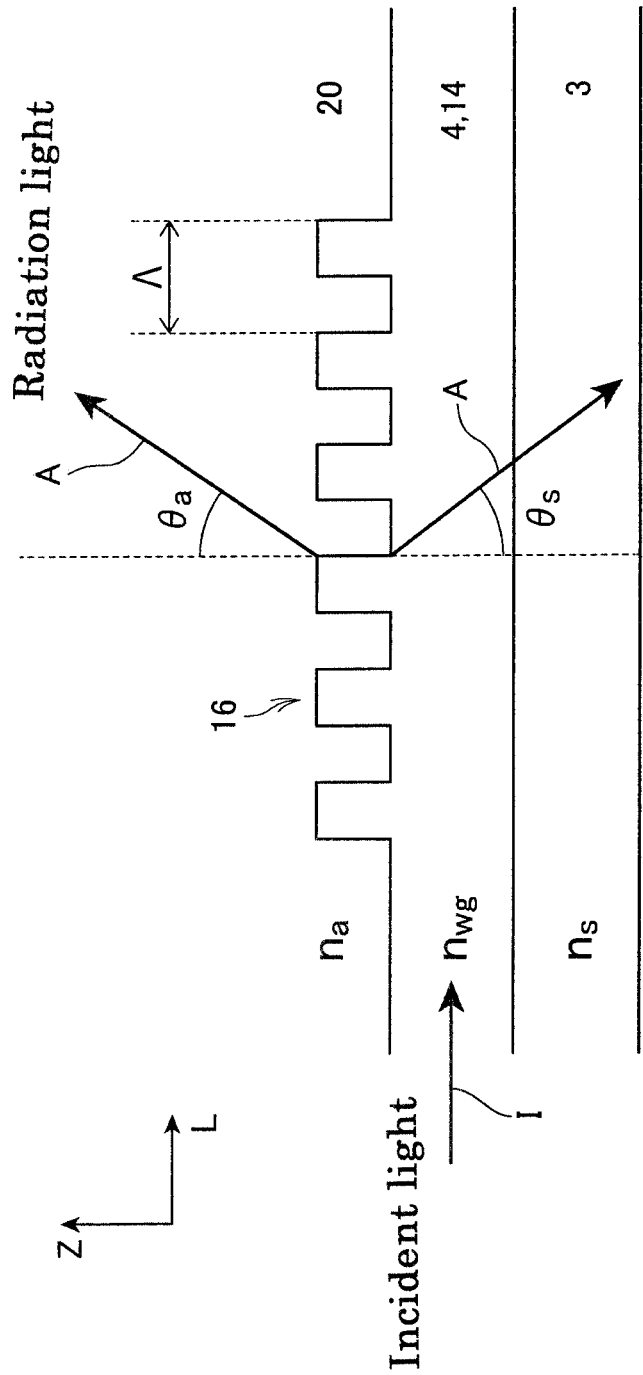
FIG. 4 is a view schematically showing relationship of incident light and emitted light in a Bragg grating coupler.

For example, as shown in FIG. 4, the incident light incident into the optical waveguide 4 or 14 propagates in the lengthwise direction "L" at a propagation constant $\beta o$. Provided that $\nabla$ is assigned to the pitch of the periodic structure of a Bragg grating, light satisfying the phase matching condition of the following formula (1) is propagated.

$$\beta q = \beta o + qK (q=0, \pm 1, \pm 2, \ldots) \quad (1)$$

Here, βo indicates a propagation constant of waveguide mode in the waveguide in the case that the grating is not present, and $K=2\pi/V$.

In the case that there is a degree "q" satisfying $|\beta q|<na\cdot k$ or $|\beta q|<ns\cdot k$, it is emitted to the upper side of the optical waveguide and side of the supporting body as arrows A.

Here, na and ns represent refractive indices of the upper clad 20 and lower clad 3 of the optical waveguide core, respectively. Further, "k" represents a wave number.

The radiation angles θ a and θ s with respect to the normal line Z can be calculated according to the following formula (2).

$$na\cdot k\cdot\sin\theta a = ns\cdot k\cdot\sin\theta s = \beta q \quad (2)$$

The formula (1) can be further represented by formula (3). The formula is satisfied in the case that $q\le-1$. Then, the first-order diffracted light is radiated at radiation angles θ a and θ s which are calculated in the case that q is −1.

$$n_{wg}\cdot\frac{2\pi}{\lambda} + \frac{2\pi}{\Lambda}q = n_a\cdot\frac{2\pi}{\lambda}\cdot\sin\theta_a \quad (3)$$
$$= n_s\cdot\frac{2\pi}{\lambda}\cdot\sin\theta_s$$

Q: diffraction order

It is understood that the radiation angles are changed depending on the wavelength. It is thus possible to change the radiation angle θ of the emitted light radiated from each of the periodic domain inversion parts, by changing the period of the periodic domain inversion part.

Further, the formulas (1) and (3) are satisfied in the case that $q\le-1$. Thus, a part of the propagating light is emitted as higher-order diffracted light, so that the higher-order diffracted light can be also utilized. Here, the higher-order diffracted light means diffracted lights of second or higher-order.

For example, second-order diffracted light is radiated to the outside of the waveguide at radiation angles θ a and θ s calculated in the case that q is −2, third-order diffracted light is radiated to the outside of the waveguide at radiation angles θ a and θ s calculated in the case that q is −3, and fourth-order diffracted light is radiated to the outside of the waveguide at radiation angles θ a and θ s calculated in the case that q is −4. Then, as the order of the diffracted light is changed, the radiation angle is changed accordingly. It is thus advantageously possible to cover a wide radiation angle range by a small number of the polarization inversion parts.

However, as the number of the order of the diffracted light is higher, the intensity of the diffracted light becomes lower. The light may not be thus propagated far so that the detectable distance becomes short, or the intensity of the light reflected by an object to be measured is low even at a short distance so that the signal-noise ratio (S/N ratio) is low, which is problematic. On the viewpoint, the order of the diffracted light may preferably be eighth-order or lower and more preferably be fourth-order or lower.

According to a preferred embodiment, for example as shown in FIGS. 1 and 2, the polarization direction "P" of the single crystal is perpendicular to the propagating direction "I" of the optical waveguide, the polarization direction "P" of the single crystal is inclined with respect to the normal direction "N" of the surface 4c or 14c of the optical waveguide 4 or 14 by an angle α of 80° or higher and 100° or lower, and the electrodes 7A to 7D, 8A to 8D, 17A to 17D and 18A to 18D are formed on the outside of the side face clad 40. With such construction, the efficiency of application of the voltage on each of the periodic domain inversion parts can be particularly improved and the difference of the refractive indices of the polarization inversion domains and non-polarization inversion domains can be increased to improve the efficiency of the diffraction grating.

The constituting elements of the present invention will be further described.

The single crystal forming the optical waveguide may preferably be lithium niobate, lithium tantalate, lithium niobate-lithium tantalate, KTP (KTiOPO4), KTN (KTa(1−x)NbxO3) or KLN (K3Li2Nb5O15).

According to a preferred embodiment, Tsub/λ is made 0.6 or higher and 10 or lower, provided that λ is assigned to a wavelength of the propagation light and Tsub is assigned to a thickness of the optical waveguide. In the case that the requirement is satisfied, the propagation light is propagated in optical waveguide mode so that it is possible to obtain the diffracted light having a high resolution.

Specific materials for the supporting body are not particularly limited, but include, for example, lithium niobate, lithium tantalate, quartz, quartz crystal, or a glass such as quartz glass. However, for preventing the conduction of heat of the light source to the periodic domain inversion parts, it can be used the supporting body having good heat dissipation property. In this case, alumina, aluminum nitride, silicon carbide, Si or the like may be listed.

The supporting body and optical waveguide may be bonded through a bonding layer or may be bonded by direct bonding at ambient temperature. In the latter case, the supporting body and optical waveguide are directly bonded without intervening the clad layer, and the supporting body functions as a clad.

It is preferably provided a clad layer, composed of a material having a refractive index lower than that of the material of the optical waveguide, between the supporting body and optical waveguide. Further, amorphous layer is generated on the bonding face so that there may be the risk of scattering light to result in an increase of propagation loss. It is thus preferred to form a clad layer having a low refractive index under the optical waveguide and to bond the clad layer having the low refractive index and the supporting body by direct bonding to form a direct bonding face.

In the case that the supporting body and optical waveguide are bonded, although the thickness of the bonding layer is not particularly limited, on the viewpoint of assuring the bonding strength for polishing the optical waveguide substrate to a thin plate, the thickness may preferably be 0.1 μm or larger and more preferably be 0.5 μm or larger. Further, on the viewpoint of reducing a stress on the bonding layer, the thickness of the bonding layer may preferably be 3 μm or smaller and more preferably be 1.5 μm or smaller.

Further, it may be provided a bonding layer functioning as a clad layer between the supporting body and optical waveguide. Alternatively, a clad layer contacting the optical waveguide may be provided in addition to the bonding layer.

According to a preferred embodiment, it is provided a reflection film reflecting the emitted light emitted from the optical waveguide between the optical waveguide and supporting body. It is thus possible to improve the light amount of the emitted light radiated to the outside of the device. Such reflection film includes a metal film of gold, aluminum, copper, silver or the like or a dielectric film. In the case that the reflection film is the metal film, the metal film may be provided between the supporting body and lower clad so that the absorption of light propagating in the optical waveguide by the metal film can be prevented.

In the case that the metal film is used as the reflection film, for preventing the separation of the clad layer formed thereon, it is possible to form a metal layer of Cr, Ni, Ti or the like as a buffer layer of the metal film. Further, the dielectric film may be a single-layered film or multi-layered film of a material such $TiO_2$, $Si_3N_4$, $Ta_2O_5$, $SiO_2$, MgF, CaF or the like.

The ridge-type optical waveguide can be obtained by physical processing and shaping such as laser ablation or cutting process by means of a peripheral cutting edge. Alternatively, the ridge-type optical waveguide can be formed by dry etching.

The materials of the lower clad layer, upper clad layer and side face clad may be a material having a refractive index lower than that of the single crystal forming the optical waveguide. The upper clad layer may be air, and in this case, it is considered that the upper clad layer is not present. Further, the materials of the respective clad layers include silicon oxide, magnesium fluoride, calcium fluoride, silicon nitride, alumina and tantalum pentoxide.

The light source may preferably be a semiconductor laser constituted by mixed crystal material mainly composed of GaN, AgAs and InP. It can be further realized a light source such as a laser array having light sources arranged one-dimensionally. The light source may be a super luminescence diode or a semiconductor optical amplifier (SOA).

The periodic domain inversion parts may preferably be formed by voltage-application method. The method of applying a voltage is not particularly limited. For example, the voltage may be applied while the body is provided in an inert gas atmosphere, or the voltage may be applied while the body is provided in insulating liquid. In the case that the voltage is applied using a probe pin for voltage application, the pin is preferably contacted with an electrode at the central position of the electrode.

The voltage for forming the periodic domain inversion parts may preferably be pulse voltage, and a direct current bias voltage may be further applied. The followings are preferred conditions of the pulse voltage.

Pulse voltage: 2.0 kV/mm to 8.0 kV/mm
Pulse width: 0.1 ms to 10 ms
Direct current bias voltage: 1.0 kV/mm to 5.0 kV/mm The periods of the periodic domain inversion parts can be appropriately determined by selecting the wavelength of the propagating light and the radiation angle to be targeted. According to a preferred embodiment, in the case that the wavelength of the propagation light is 800 nm to 1 μm, the period of the periodic domain inversion part may be changed in a range of 0.1 to 2 μm. It is thereby possible to appropriately adjust the radiation angle in a range of −90 to 90°.

Besides, the radiation angle is θ a shown in FIG. 4, and the radiation angle on the emission side is made positive with respect to the normal direction of the surface of the optical waveguide.

Figure 14:
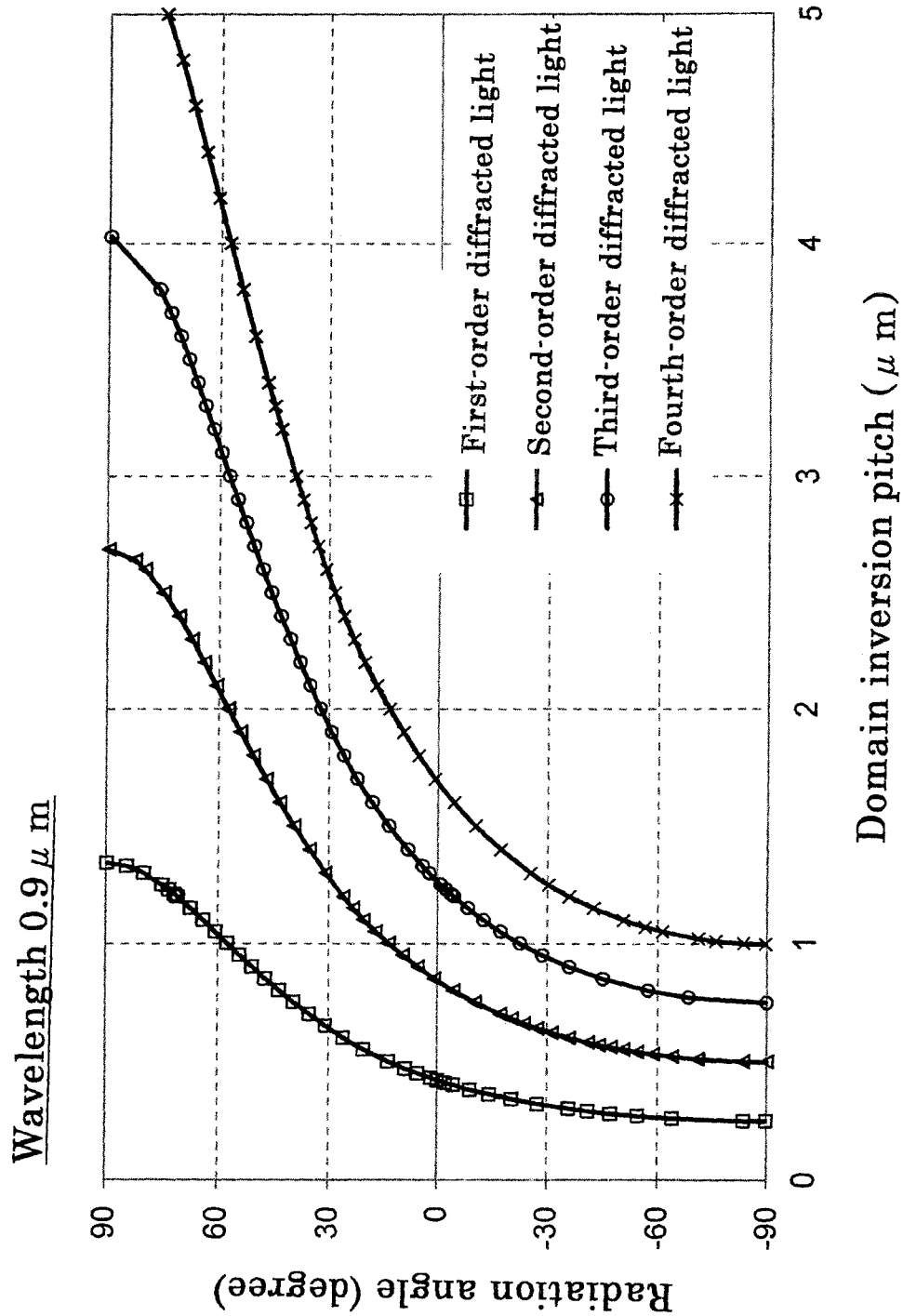
FIG. 14 is a graph showing relationship of a pitch of periodic domain inversion and radiation angle in the case that first-order and higher-order diffraction light beams are used.

Although the above descriptions relate to the case that the order of diffraction is first-order. Higher-order diffracted light may be utilized as described above. FIG. 14 shows calculated values of the periods of domain inversion and radiation angles in the diffracted lights of first-order to fourth-order. As shown in FIG. 14, it is possible to change the radiation angle from that in the case using the first-order diffracted light, by utilizing the second or higher order diffracted light. Further, it is possible to obtain the radiation angle same as that in the case of utilizing the first-order diffracted light even when the period of the polarization inversion period is made larger. By this, the patterning can be performed with a mask aligner without using an expensive apparatus such as a stepper or electron exposing apparatus in the patterning process of the polarization inversion, so that it is possible to realize an inexpensive optical scanner device.

Figure 15:
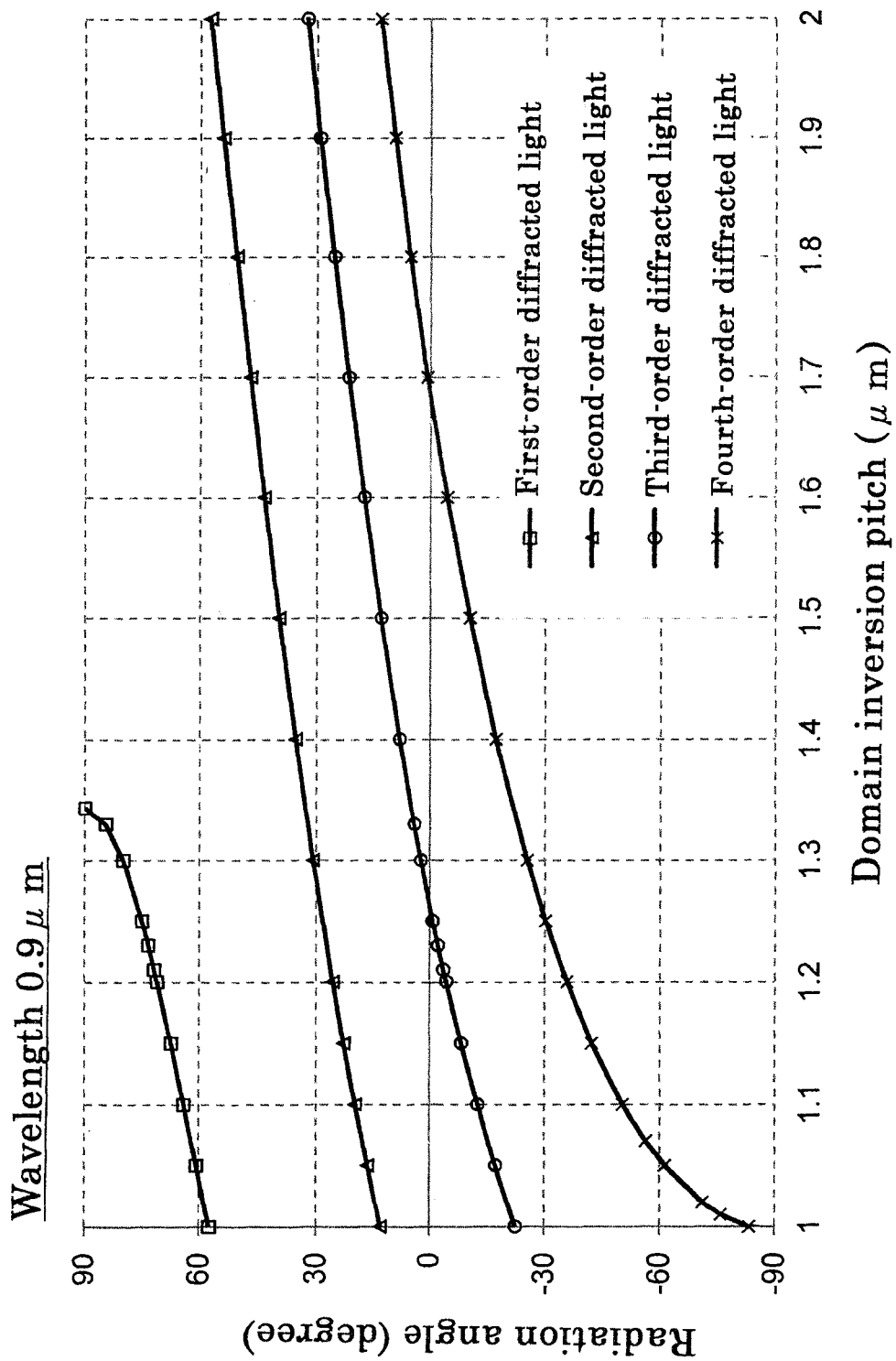
FIG. 15 is a graph showing relationship of a pitch of periodic domain inversion and radiation angle in the case that first-order and higher-order diffraction light beams are used.

It is further possible to realize a wide range of the radiation angle by utilizing a plurality of the diffracted lights having the orders different from each other in combination. For example, as illustrated in FIG. 15, it is formed the polarization inversion parts having polarization periods of 1 μm to 2 μm. By this, a range of plus 90° to plus 60° is covered by the first-order diffracted light, a range of plus 60° to plus 30° is covered by the second-order diffracted light, a range of plus 30° to plus 0° is covered by the third-order diffracted light, and a range of 0° to minus 90° is covered by the fourth-order diffracted light, so that it becomes possible to constitute a variable optical polarizer device for a wide angle range with a small number of the polarization inversion parts. It is thus possible to realize miniaturization, high resolution of angles and low cost.

It is possible to scan a surface to be measured using the optical scanning device of the present invention. That is, the emitted light emitted from the optical scanning device is irradiated onto the surface to be measured and light reflected from the surface to be measured is used to obtain data relating to the surface to be measured. Such data includes the position of the surface to be measured.

According to a preferred embodiment, the surface to be measured is scanned while the optical scanning device is moved in the lengthwise direction of the optical scanning device. The embodiment will be described further.

As shown in FIG. 3, the spread angle of the emitted light from the device is narrower in the propagation direction L of the optical waveguide (lengthwise direction of the device) and wider in the direction W parallel with the polarization inversion plane and parallel with the upper face of the optical waveguide. The emitted lights are radiated at radiation angles different from each other from the respective polarization inversion parts viewed in the lengthwise direction of the device.

Thus, in the case that the device is used as a three-dimensional laser scanner for auto-driving of an automobile, as illustrated later referring to FIG. 7, the lengthwise direction L of the device is adjusted to horizontal direction and the direction W is adjusted to vertical direction, so that the need of scanning in the vertical direction can be alleviated. It is thus possible to reduce the number of reception devices to provide inexpensive apparatus structure.

Figure 5:
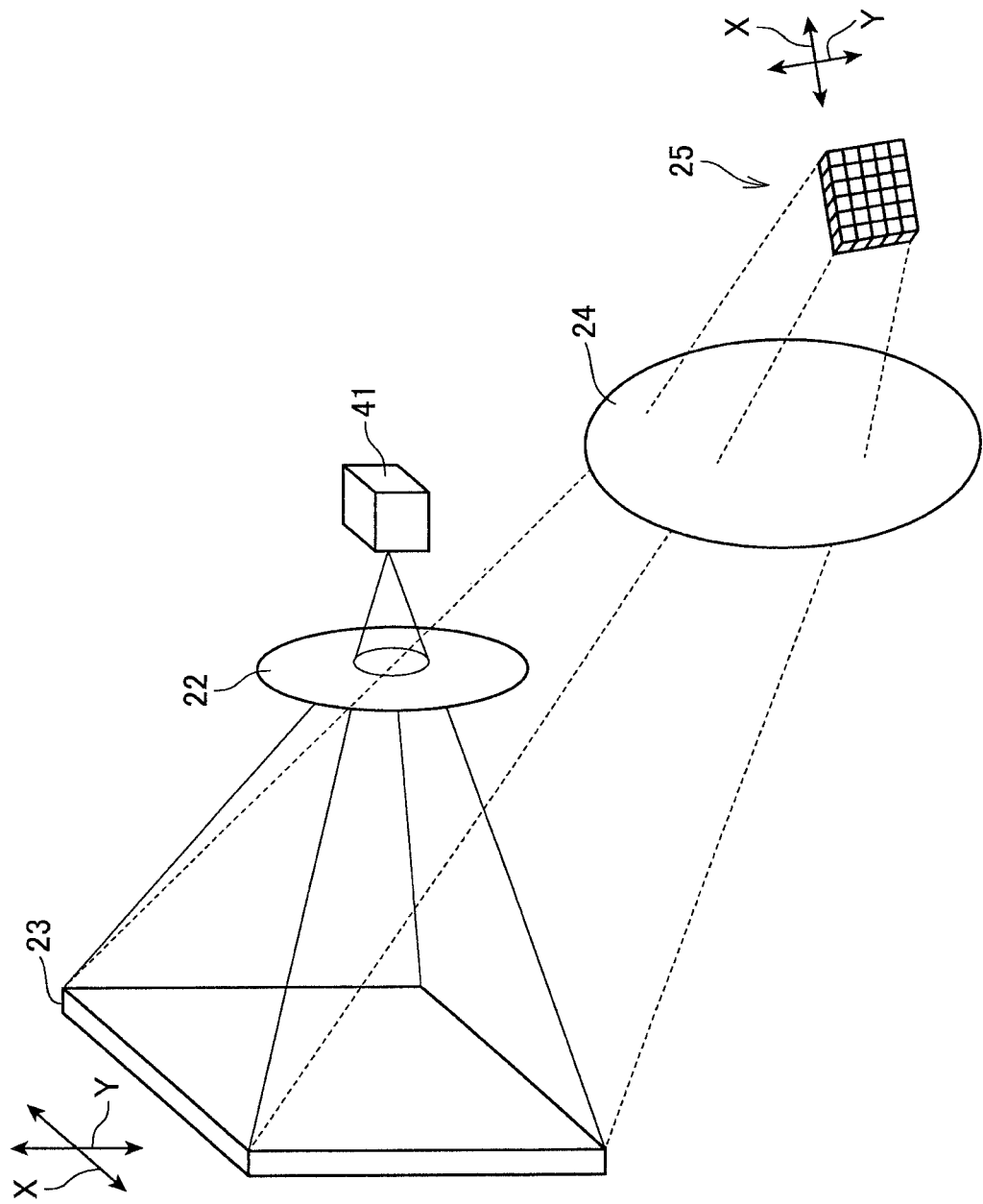
FIG. 5 shows the state that emitted light beams from an optical scanning device are reflected and received by divided optical receiving elements 25.

For example, FIG. 5 shows a system according to reception device division system.

Light emitted from a semiconductor laser 41 condensed by a lens 22 is projected onto a surface 23 to be measured. The light reflected from the surface to be measured is projected onto a reception device array 25 by a lens 24. Here, the reception device array 25 is composed of many photo diodes arranged in the horizontal direction X and vertical directions Y, respectively, for detecting information of the surface to be measured higher at a high resolution. According to the system, it is not used an optical scanning device including a plurality of laser devices or a high-precision mirror such as a polygon mirror or MEMS mirror, resulting in a relatively inexpensive system. It is possible to reduce the cost of the reception device array compared with those of the system including the laser devices or optical scanning device. However, it is necessary to provide many photo diodes in the horizontal direction X and vertical direction Y of the surface to be measured. Moreover, as the emitted light is projected from the device at a single position, the optical intensities corresponding with the respective light reception devices are low, so that the signal/noise ratio becomes low, which is problematic.

Figure 6:
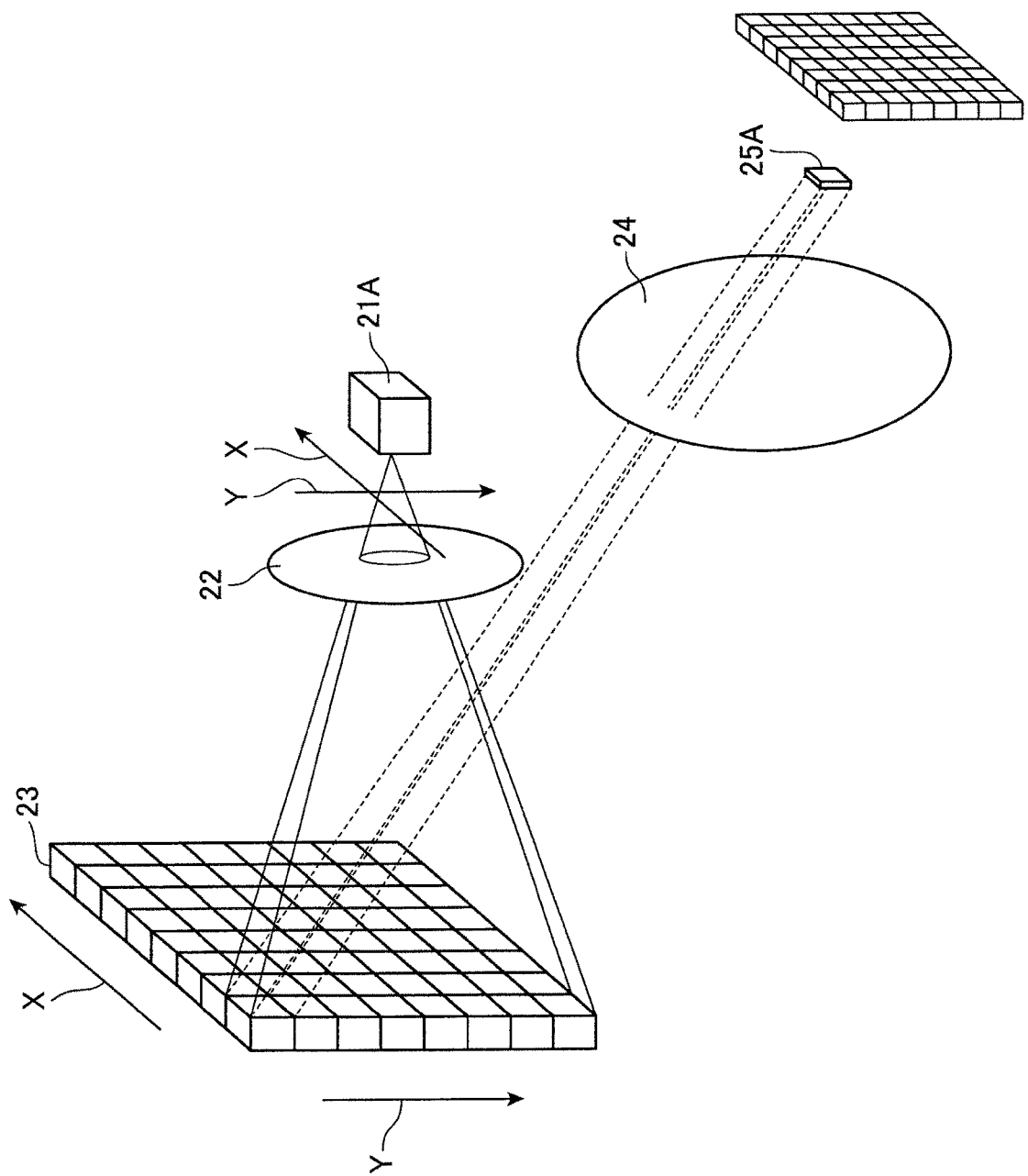
FIG. 6 shows the state that a surface to be measured is scanned while the optical scanning device is moved in X and Y direction and that the reception of the light beam is performed by the divided optical receiving elements.

FIG. 6 shows an optical scanning system utilizing a laser scanner.

According to the present example, the laser device 21A is scanned in the X and Y directions, respectively, by means of a polygon mirror, and light is condensed by a lens 22 and irradiated onto the surface 23 to be measured. Here, the surface to be measured is sequentially scanned in the X direction and Y direction, respectively. The reflected light from the surface to be measured is condensed by a lens 24 and received by a light reception device 25A. However, according to the method, it is required the mechanism of scanning the laser light in both of the X direction and Y direction, respectively.

Figure 7:
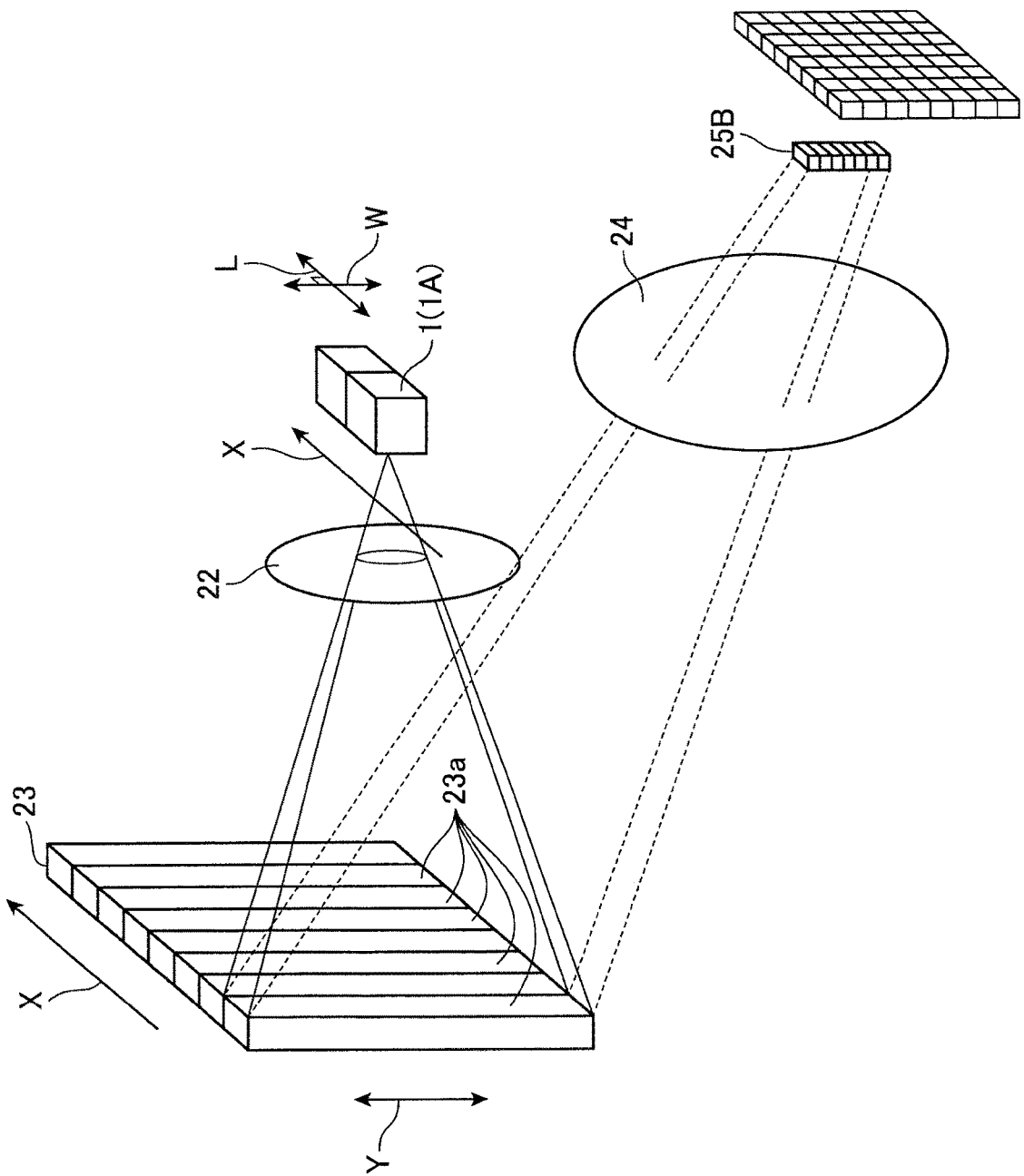
FIG. 7 shows the state that the optical scanning device of the present invention is used to scan an object surface.

In FIG. 7, it is used the optical scanning device 1 or 1A of the present invention. Here, the light emitted from the inventive device has the characteristics of expanding toward the direction W perpendicular to the lengthwise direction L of the device. Thus, in the case that the lengthwise direction L of the device is aligned to the horizontal direction X, the light emitted from the device expands in the vertical direction Y. As the emitted light is projected onto the surface 23 to be measured through the lens 22, the light is projected onto a region 23a extending in the vertical direction of the surface 23 to be measured. The light reflected by the region 23a is condensed by the lens 24 and received by a light reception device array 25B.

Here, by using the inventive device, it is possible to project the emitted light onto each of the elongate regions 23a of the surface 23 to be measured, and to measure the reflected light by a single column of the light reception device array. It is thus possible to scan the whole of the surface to be measured sequentially and to scan the whole of the surface to be measured for obtaining information, while the device 1 or 1A is move in the lengthwise direction L of the device. As a result, it is possible to reduce the time and the cost required for the scanning than those required in prior arts and to considerably reduce the cost of the light reception device array.

In this case, the light reception device may be photo diodes, CMOS cameras or CCD's arranged two-dimensionally in the X direction and Y direction as shown in FIG. 5. In the case that it is used the diffracted light of the higher order, a plurality of the diffracted lights is emitted from the single polarization inversion part. It is thereby difficult to detect the angle of the reflected light by means of the light reception devices arranged one-dimensionally. In the case that it is used the light reception devices arranged two-dimensionally, it is possible to fix the positional relationship of the angle and light reception device, so that the signal can be easily processed.

Figure 13:
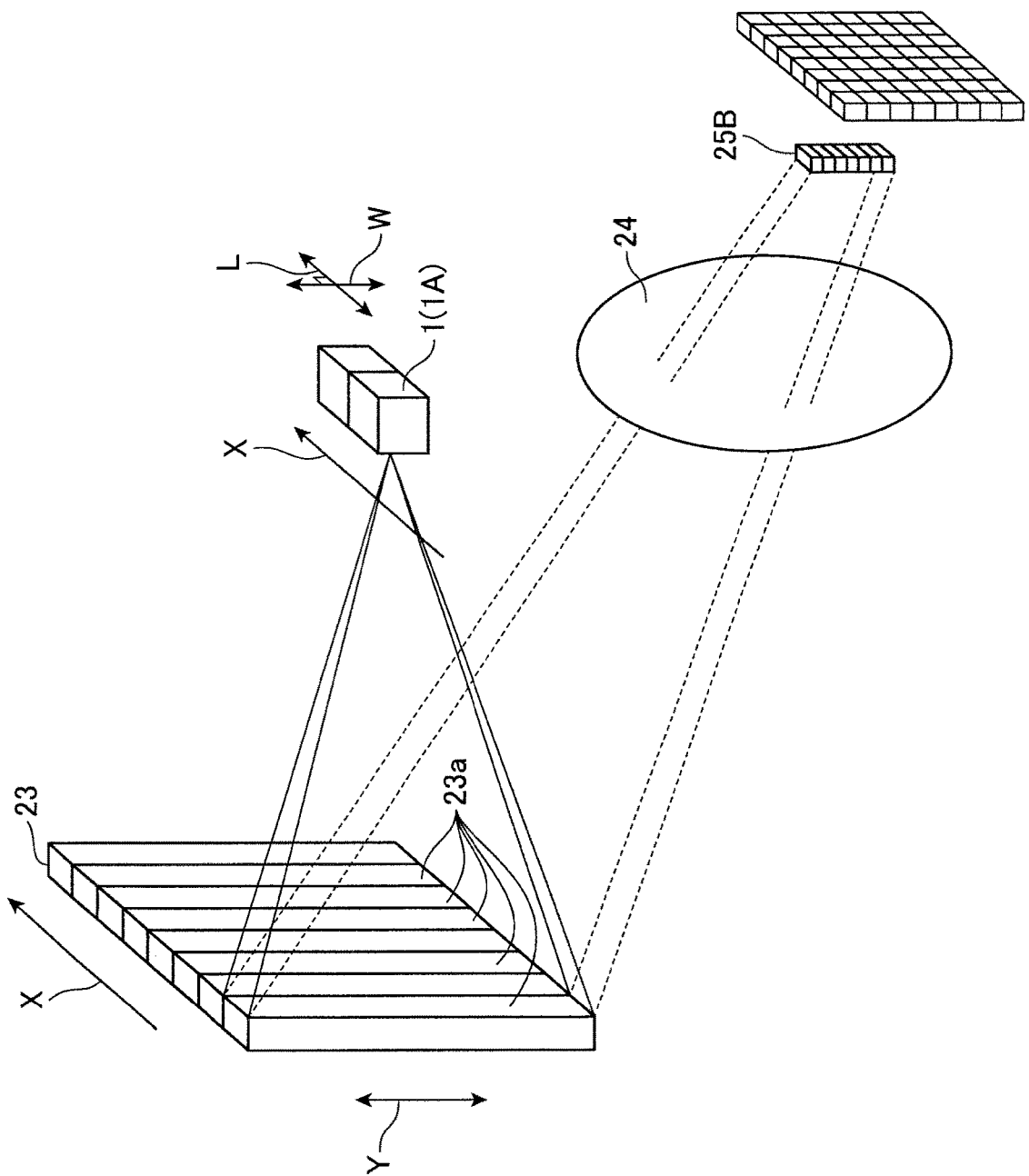
FIG. 13 shows the state that the optical scanning device of the present invention is used to scan an object surface.

Further, as the beam generated from the inventive optical scanning device is expanded in the Y direction in a wide angle, it is possible to scan the surface to be measured without providing a lens condensing the emitted light from the optical scanning device 1 (1A), as shown in FIG. 13.

Also in this case, the light reception device may be the photo diodes, CMOS cameras or CCD's arranged two-dimensionally in the X direction and Y direction, as the example of FIG. 7.

It will be supplemented the method of measuring a distance utilizing a semiconductor laser.

According to the method, laser light is irradiated onto an obstacle, the reflected light from the obstacle is detected by a light reception device, and the time for the propagation after the irradiation is measured to measure a distance to the obstacle. The method is generally referred to as time off flight (TOF) method.

In the case that the optical scanning device of the present invention is used to measure a distance in three-dimensional space, the spread angle of the light emitted from the device can be enlarged in a range of 5° to 40° in the width direction W of the waveguide and in a range of 1° to 10° in the lengthwise direction L of the device, by selecting the shape of the waveguide and the materials of the core and clad of the waveguide. The spread angle can be made 1° or smaller in the lengthwise direction of the device, by reducing the deviation of the shape of the waveguide or the period of the diffraction grating. By utilizing such property, as shown in FIG. 7, it is possible to constitute the system of measuring a distance using a photodiode array only in the vertical direction Y. It is thus possible to attain longer distance of measurement, which has been the problem of the prior divided light-reception system, and to realize the system at a low cost at the same time.

Figure 10A:
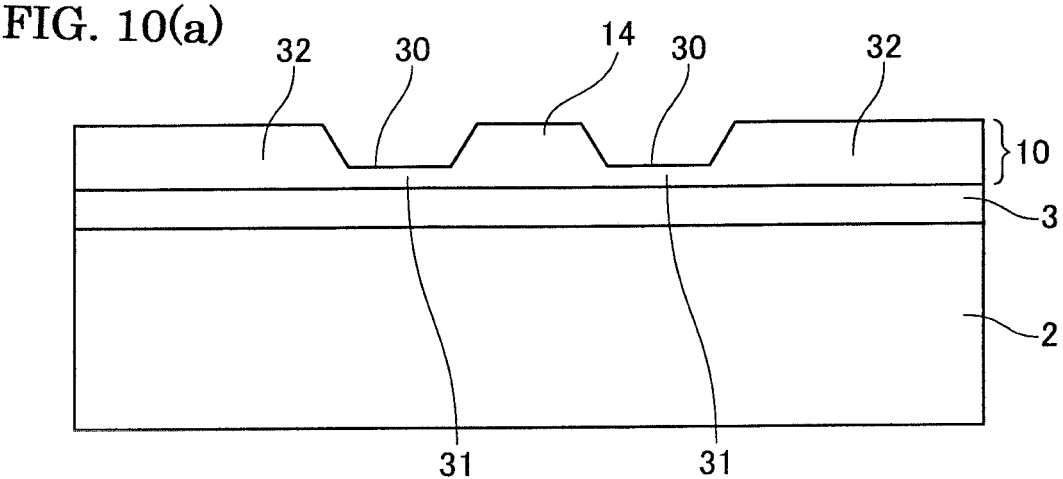
FIGS. 10(a), 10(b) and 10(c) are cross sectional views schematically showing cross sectional structures of optical scanning devices, respectively.

According to a preferred embodiment, as shown in FIG. 10(a), a single crystal layer 10 is formed over a supporting body 2 through a lower buffer layer 3. A pair of ridge grooves 30 is formed in the single crystal layer 10, for example, so that an optical waveguide core 14 is formed between the ridge grooves. The periodic domain inversion parts may be provided on the side of the supporting body or on the side opposite to the supporting body of the optical waveguide core. 31 represents a thin part and 32 represents an extension part. According to the present example, the upper clad layer is not provided, and the single crystal layer 10 faces air. An adhesive layer may be provided between the clad layer 3 and supporting body 2.

Figure 10B:
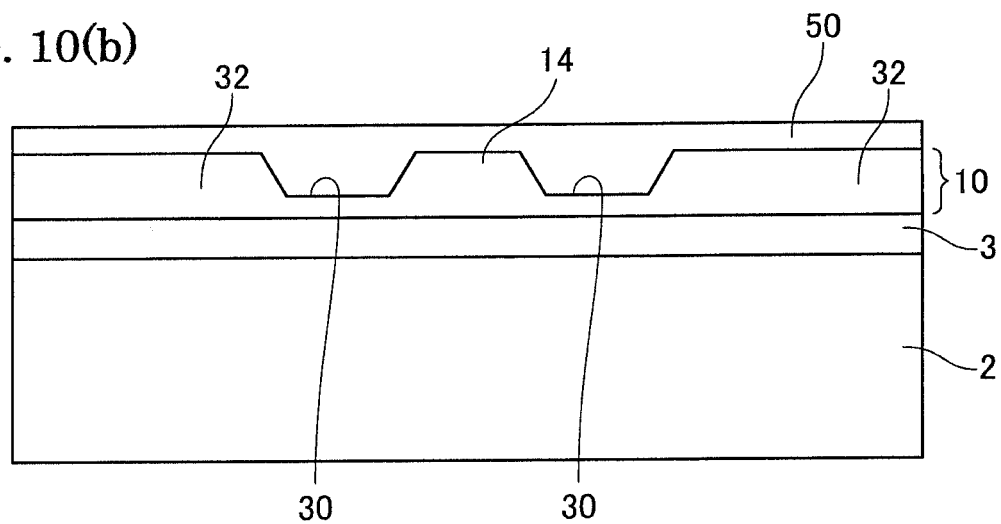

Further, According to a device shown in FIG. 10(b), an upper clad layer 50 is further formed on the single crystal layer 10.

Figure 10C:
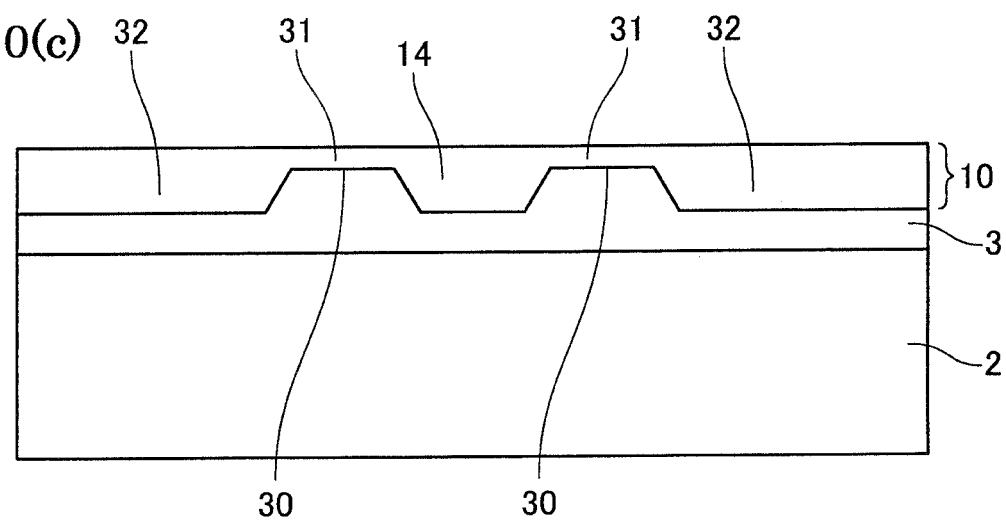

Further, as shown in FIG. 10(c), the single crystal layer 10 is formed over the supporting body 2 through the lower clad layer 3. A pair of the ridge grooves 30 is formed in the single crystal layer 10, for example, and the ridge type optical waveguide core 14 is formed between the ridge grooves. According to the present example, the ridge grooves are provided on the side of the supporting body. 31 represents a thinner part and 32 represents an extension part.

According to a preferred embodiment, the optical waveguide is composed of a core made of an optical material, and the core is surrounded by a clad. The cross section (cross section perpendicular to the direction of propagation of light) of the core is made a convex figure.

The convex figure means that line segments connecting two arbitrary points on an outside contour line of the cross section of a core are positioned inside the outside contour line of the cross section of the core. The convex figure is a general term in geometry. Examples which can be exemplified as such a figure include polygon such as triangle, tetragon, hexagon, octagon or the like, circle, ellipse, and so forth. Specifically, the tetragon possessing an upper side, a lower side, and a pair of side faces is preferable as a tetragon, and a trapezoid is specifically preferable.

Figure 11A:
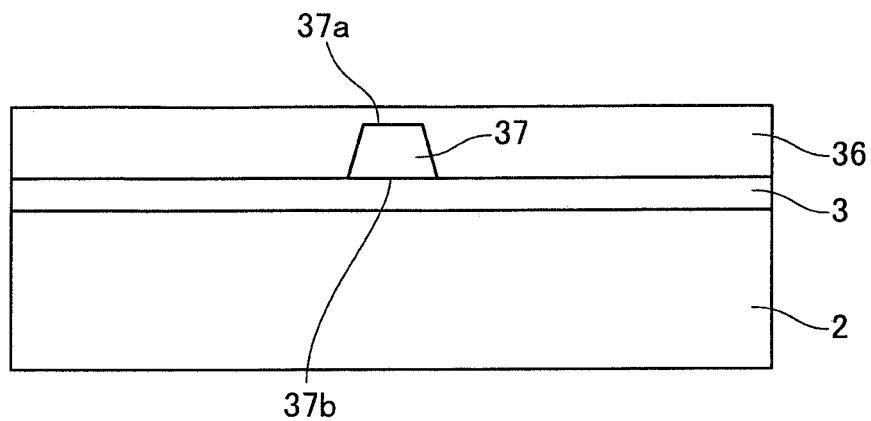
FIGS. 11(a), 11(b) and 11(c) are cross sectional views schematically showing cross sectional structures of optical scanning devices, respectively.

For example, as shown in FIG. 11(a), an optical waveguide core 37 made of a single crystal is formed over the supporting body through the lower clad layer 3. The cross-sectional shape of the core 37 is a trapezoid whose upper face 37a is narrower than its lower face 37b. The clad layer 36 is formed to cover the core 37. Further, an adhesive layer may be formed between the clad layer 36 and supporting body 2.

Figure 11B:
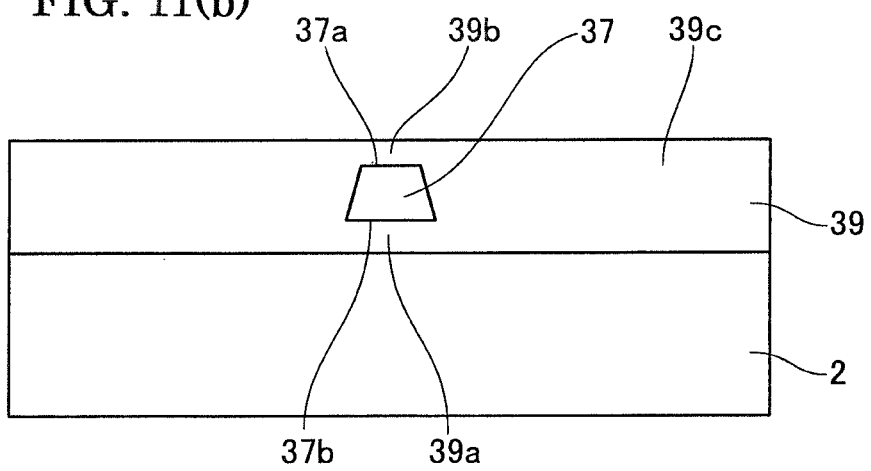

According to a device shown in FIG. 11(b), a clad layer 39 is provided on the supporting body 2, and an optical waveguide core 37 made of a single crystal is embedded in the clad layer 39. The clad layer 39 includes an upper face covering part 39a covering an upper face of the optical waveguide core, a side face covering part 39c covering a side of the optical waveguide and a bottom face covering part 39a positioned between the optical waveguide and supporting body.

Figure 11C:
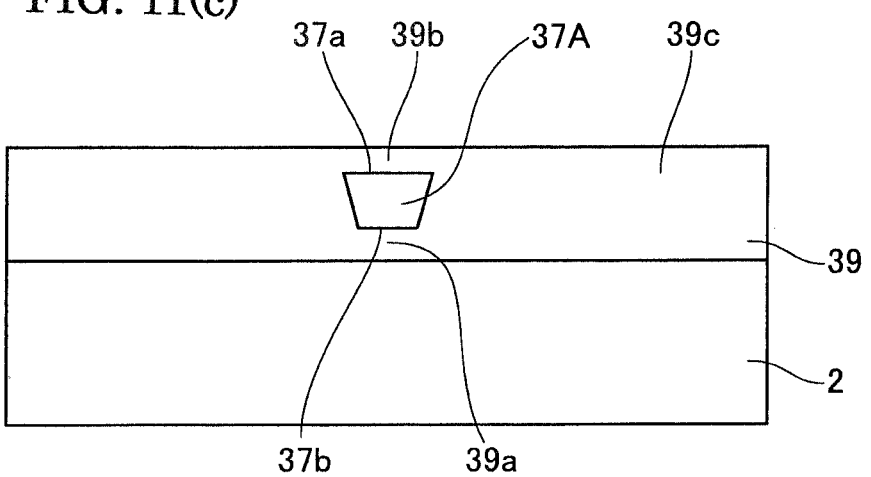

According to a device a device shown in FIG. 11(c), a clad layer 39 is provided on the supporting body 2, and an optical waveguide core 37A made of a single crystal is embedded in the clad layer 39. The clad layer 39 includes an upper face covering part 39b covering the upper face of the optical waveguide core, the side face covering part 39c covering the side face of the core and the bottom face covering part 39a provided between the core and supporting body.

Figure 12A:
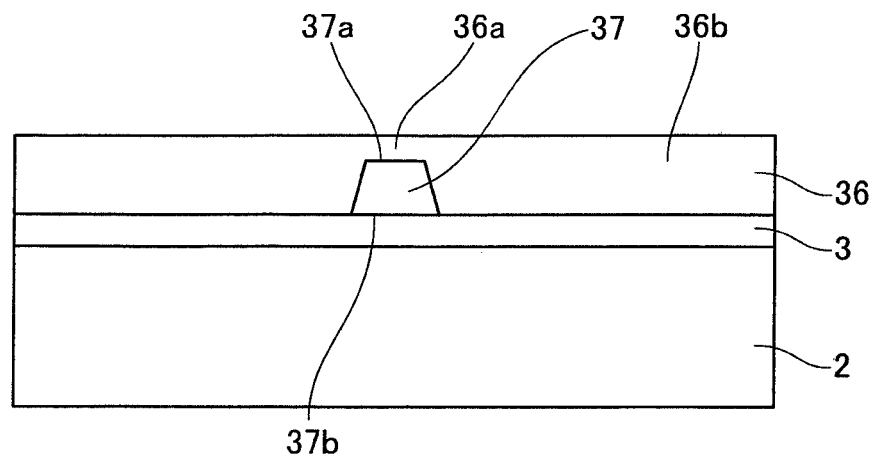
FIGS. 12(a) and 12(b) are cross sectional views schematically showing cross sectional structures of optical scanning devices, respectively.

Further, according to a device shown in FIG. 12(a), an optical waveguide core 37 made of a single crystal is formed over the supporting body 2 through the lower clad layer 3. An upper clad layer 36 is formed on the side faces and upper face 37a of the optical waveguide core 37, so that the optical waveguide core 37 is covered thereby. The upper clad layer 36 includes the side face covering parts 36b covering the side faces of the optical waveguide core 37 and the upper clad covering part 36a covering the upper face.

Figure 12B:
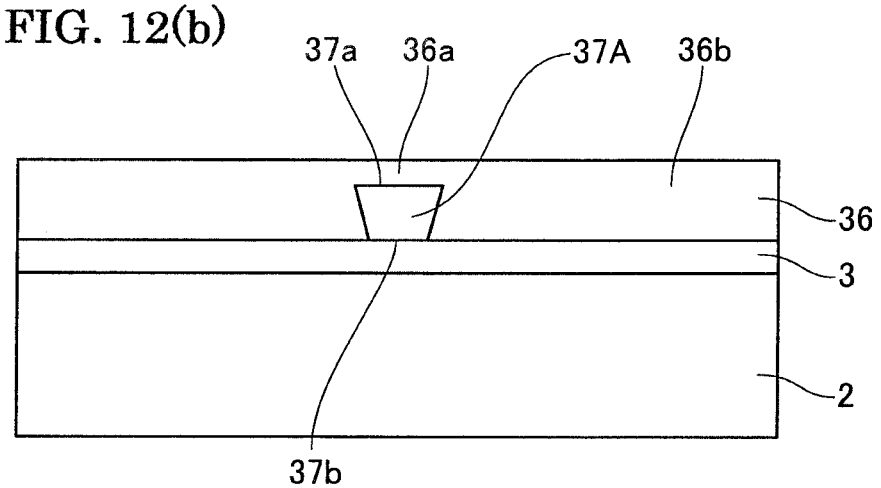

Further, according to a device shown in FIG. 12(b), it is formed an optical waveguide core 37A made of an optical material. The cross sectional shape of the optical waveguide 37A is a trapezoid, whose lower face is narrower than the upper face. The upper clad layer 36 includes a side face covering part 36b covering the side face and the upper face covering part 36a of the optical waveguide core 37A.

EXAMPLES

Experiment 1

It was produced an optical scanning device 1A shown in FIGS. 2 and 10(b).

Specifically, interdigitated electrode patterns having periods of 300 nm, 400 nm, 500 nm and 800 nm, respectively, were formed on a wafer composed of a 5° off-cut y-plate of lithium niobate (LN) single crystal doped with MgO. Voltages were then applied in the direction of c-axis of crystalline axes to form periodic domain inversion parts 16A to 16D, respectively. The depth of the domain inversion part was 5 μm in the optical waveguide. The clad layer made of SiO2 was formed on the surface of the domain inversion part by sputtering in a film thickness of 5000 angstrom. Further, resist was applied on the surface formed by SiO2, and two ridge grooves each having a thickness of 100 μm were then processed by dicing using a resin blade of #6000 and a width of 50 μm to form the ridge type optical waveguide 14 having a width of 5 μm.

Thereafter, SiO2 film 50 was further formed by sputtering, and Ti, Pt and Au films were then formed as an electrode in 200, 100 and 5000 angstroms, respectively. The resist was finally peeled off by an organic solvent to from the electrode on the side face of the ridge type optical waveguide.

Finally, the wafer was cut into blocks by dicing and both end faces of the waveguide was polished in each block and an anti-reflection coating was formed for input light having a wavelength of 900 nm on each of the end faces. The block was cut into chips.

A semiconductor laser of a wavelength of 900 nm was fixed on a silicon substrate by AuSn solder, and the chip of the optical scanning device was fixed by AuSn solder after the optical axis of the laser light is aligned with the optical axis of the optical waveguide, to obtain a laser module. For the connection from the electrodes formed in the domain inversion parts to an outer electric source circuit, bonding wires were used to perform the conduction, voltages were applied onto the respective electrodes, and the radiation angles from the optical waveguide were confirmed. The amplitudes of the input voltages were made 10V.

As a result, light beams could be drawn to the outside of the device, at a radiation angle of −33° from the periodic domain inversion part 16A, at a radiation angle of −1.9° from the periodic domain inversion part 16B, at a radiation angle of 15° from the periodic domain inversion part 16C, and at a radiation angle of 47° from the periodic domain inversion part 16D, respectively. It was further confirmed that the laser light can be scanned by switching the application of the voltage onto the periodic domain inversion parts. Further, the spread angles of expansion of the laser lights radiated to the outside of the device were 40° in the width direction of the optical waveguide and 3° in the lengthwise direction of the device.

Experiment 2

An optical scanning device was produced according to the procedure substantially same as that in the experiment 1.

Figure 8:
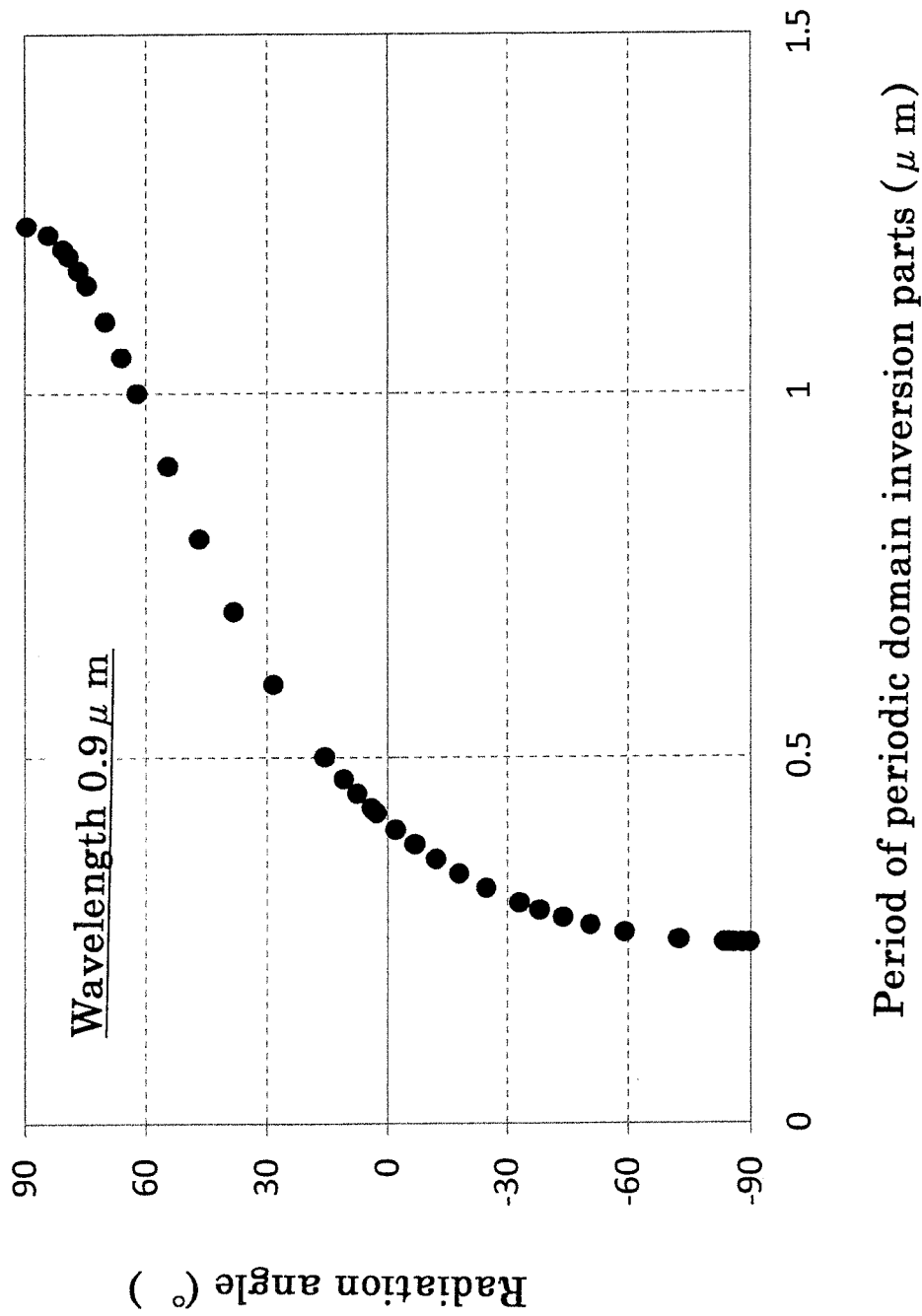
FIG. 8 is a graph showing relationship of a domain inversion period and an angle of emission of emitted light beam.

At this time, the periods of the periodic domain inversion parts were changed as shown in FIG. 8. The wavelength of the propagation light was made 0.9 μm. FIG. 8 shows the relationship of the periods of the periodic domain inversion parts and radiation angles.

Experiment 3

An optical scanning device was produced according to the procedure substantially same as that in the experiment 1.

Figure 9:
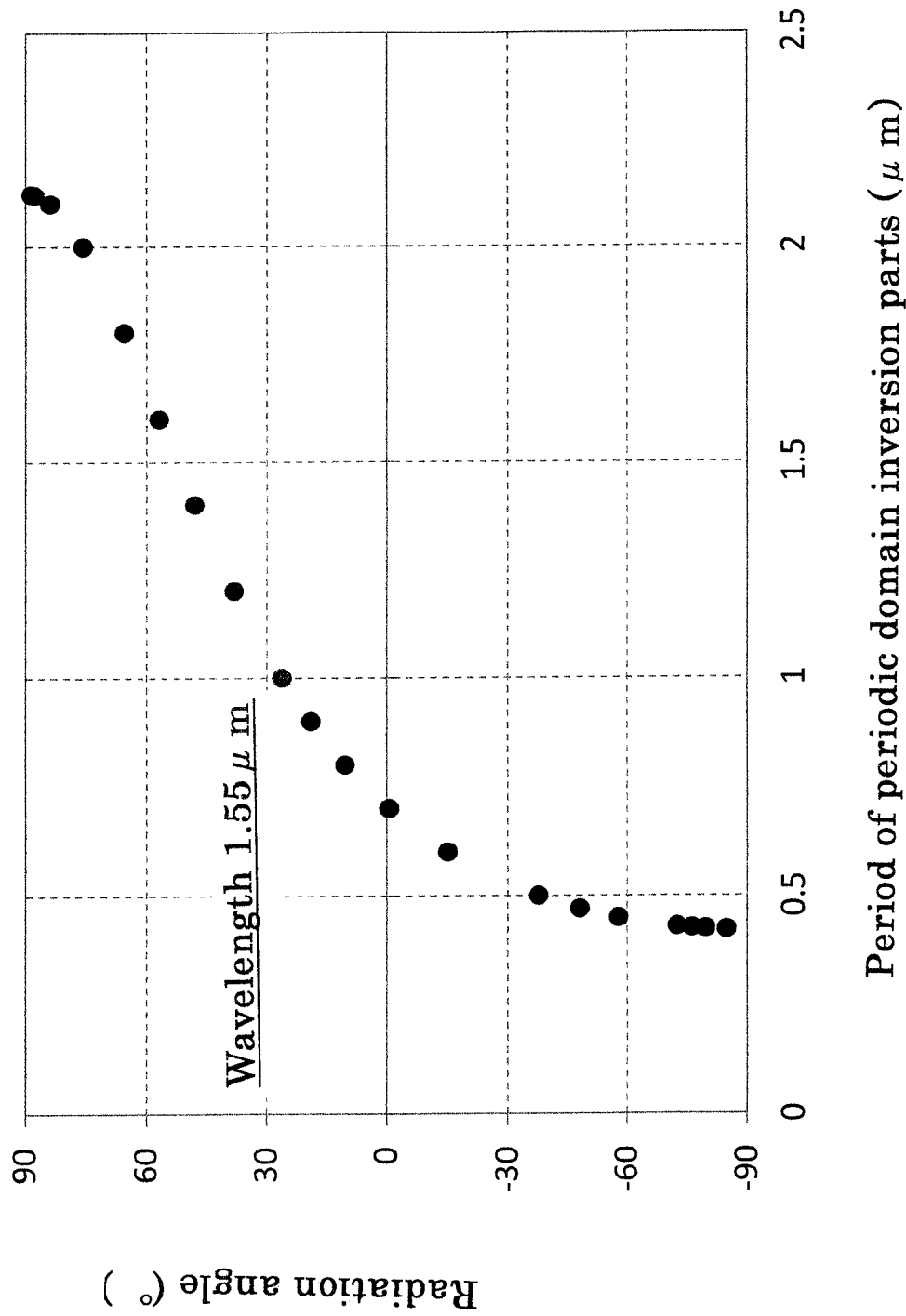
FIG. 9 is a graph showing relationship of the domain inversion period and angle of emission of the emitted light beam.

At this time, the periods of the periodic domain inversion parts were changed as shown in FIG. 9. The wavelength of the propagation light was made 0.9 μm. FIG. 9 shows the relationship of the periods of the periodic domain inversion parts and radiation angles.

Experiment 4

It was produced an optical scanning device 1A shown in FIGS. 2 and 10(b).

Specifically, nine interdigitated electrode patterns having periods in a range of 1.2 μm to 2 μm were formed, respectively, at an interval of 0.1 μm on a wafer composed of a 5° off-cut y-plate of lithium niobate (LN) single crystal doped with MgO. The subsequent process steps were made same as those in the experiment 1.

A semiconductor laser of a wavelength of 900 nm was fixed on a silicon substrate by AuSn solder, and the chip of the optical scanning device was fixed by AuSn solder after the optical axis of the laser light is aligned with the optical axis of the optical waveguide, to obtain a laser module. For the connection from the electrodes formed in the domain inversion parts to an outer electric source circuit, bonding wires were used to perform the conduction, voltages were applied onto the respective electrodes, and the radiation angles from the optical waveguide were confirmed. The amplitudes of the input voltages were made 10V.

Here, periodic domain inversion parts 16A, 16B, 16C, 16D, 16E, 16F, 16G, 16H and 16I were arranged in this order from the periodic domain inversion part having the shortest period. As a result, the following diffracted lights were radiated from the respective periodic domain inversion parts.

| Periodic domain: | Diffracted lights: | Radiation angles inversion parts: |
|---|---|---|
| 16B | First-order diffracted light; | 80° |
| 16A | First-order diffracted light; | 71° |
| 16I | Second-order diffracted light; | 57.5° |
| 16H | Second-order diffracted light; | 54.2° |
| 16G | Second-order diffracted light; | 50° |
| 16F | Second-order diffracted light; | 47° |
| 16E | Second-order diffracted light; | 43.6° |
| 16D | Second-order diffracted light; | 39.7° |
| 16C | Second-order diffracted light; | 35.5° |
| 16B | Second-order diffracted light; | 31° |
| 16H | Third-order diffracted light; | 29.3° |
| 16G | Third-order diffracted light; | 25.8° |
| 16F | Third-order diffracted light; | 22° |
| 16E | Third-order diffracted light; | 18° |
| 16D | Third-order diffracted light; | 13.3° |
| 16C | Third-order diffracted light; | 8.2° |
| 16B | Third-order diffracted light; | 2.5° |
| 16F | Fourth-order diffracted light; | 0.8° |
| 16E | Fourth-order diffracted light; | −4.3° |
| 16D | Fourth-order diffracted light; | −10.2° |
| 16C | Fourth-order diffracted light; | −17° |
| 16B | Fourth-order diffracted light; | −25.3° |
| 16A | Fourth-order diffracted light; | −35.8° |

It was further confirmed that the laser light can be scanned by switching the application of the voltages in the respective periodic domain inversion parts. Further, the spread angles of expansion of the laser lights radiated to the outside of the device were proved to be 40° in the width direction of the optical waveguide and 0.5° in the lengthwise direction of the device, by controlling the precision of the pitch of each periodic domain inversion part in ±0.5 nm.

As shown in the experiments 2 to 4, it is possible to change the radiation angle from the optical waveguide in a range of 0 to 90° by changing the periods of the periodic domain inversion parts. The present invention is thus particularly useful.

The invention claimed is:

1. An optical scanning device for selectively emitting a diffracted light in at least one of a plurality of directions that are different from each other, said device comprising:
    a supporting body;
    an optical waveguide comprising a single crystal having electro-optic effect and integrated with said supporting body directly or through a clad layer;
    a plurality of periodic domain inversion parts formed in said optical waveguide, said periodic domain inversion parts having periods different from each other;
    a plurality of electrodes, each being capable of applying a voltage on each of said periodic domain inversion parts to generate a diffraction grating in each of said periodic domain inversion parts; and
    a side face clad provided between said optical waveguide and said electrodes,
    wherein said clad layer and side face clad comprise materials having refractive indices lower than a refractive index of said single crystal forming said optical waveguide, respectively;
    wherein each of said periodic domain inversion parts on which said voltage is applied is selected to generate said diffraction grating in said selected periodic domain inversion part, and said diffraction grating is not generated in each of the said periodic domain inversion parts which is not selected, wherein said diffraction grating is capable of emitting said diffracted light in said one of said plurality of directions; and
    wherein a propagation light is propagated in said optical waveguide and said diffracted light is emitted from said diffraction grating generated in said selected periodic domain inversion part to the outside of said optical scanning device in said one of the said plurality of directions.

2. The device of claim 1, wherein said optical waveguide is integrated with said supporting body through said clad layer.

3. The device of claim 1, wherein $T_{sub}/\lambda$, is 0.6 or higher and 50 or lower, provided that $T_{sub}$ is assigned to a thickness of said optical waveguide and $\lambda$, is assigned to a wavelength of said propagation light propagating in said optical waveguide.

4. The device of claim 1, wherein said single crystal has a polarization direction perpendicular to a propagation direction of said optical waveguide,
    wherein said polarization direction of said single crystal is inclined with respect to a normal direction of a surface of said optical waveguide by an angle of 80° or larger and 100° or smaller, and
    wherein each of said electrodes is formed on the outside of said side face clad.

5. The device of claim 1, wherein said diffracted light comprises a first-order diffracted light.

6. The device of claim 1, wherein said diffracted light comprises a second-order or higher-order diffracted light.

7. The device of claim 1, wherein said diffracted light comprises diffracted lights of a plurality of orders different from each other, said diffracted lights being emitted.

8. A method of scanning a surface to be measured using said optical scanning device of claim 1, said method comprising:
    irradiating said emitted light emitted from said optical scanning device onto said surface to be measured; and
    obtaining data relating to said surface to be measured using a reflection light reflected by said surface to be measured.

9. The method of claim 8, wherein said surface to be measured is scanned while said optical scanning device is moved in a lengthwise direction of said optical scanning device.

10. The device of claim 1, wherein said diffracted light comprises a first-order diffracted light and a second-order or higher-order diffracted light.

11. The device of claim 1, wherein the plurality of electrodes are provided on both ends of the respective periodic domain inversion parts on opposite side faces of said optical wave guide.

* * * * *